Nov. 15, 1927.
R. J. SWEET
1,649,554
INTERNAL COMBUSTION ENGINE
Filed June 16, 1921   3 Sheets-Sheet 1
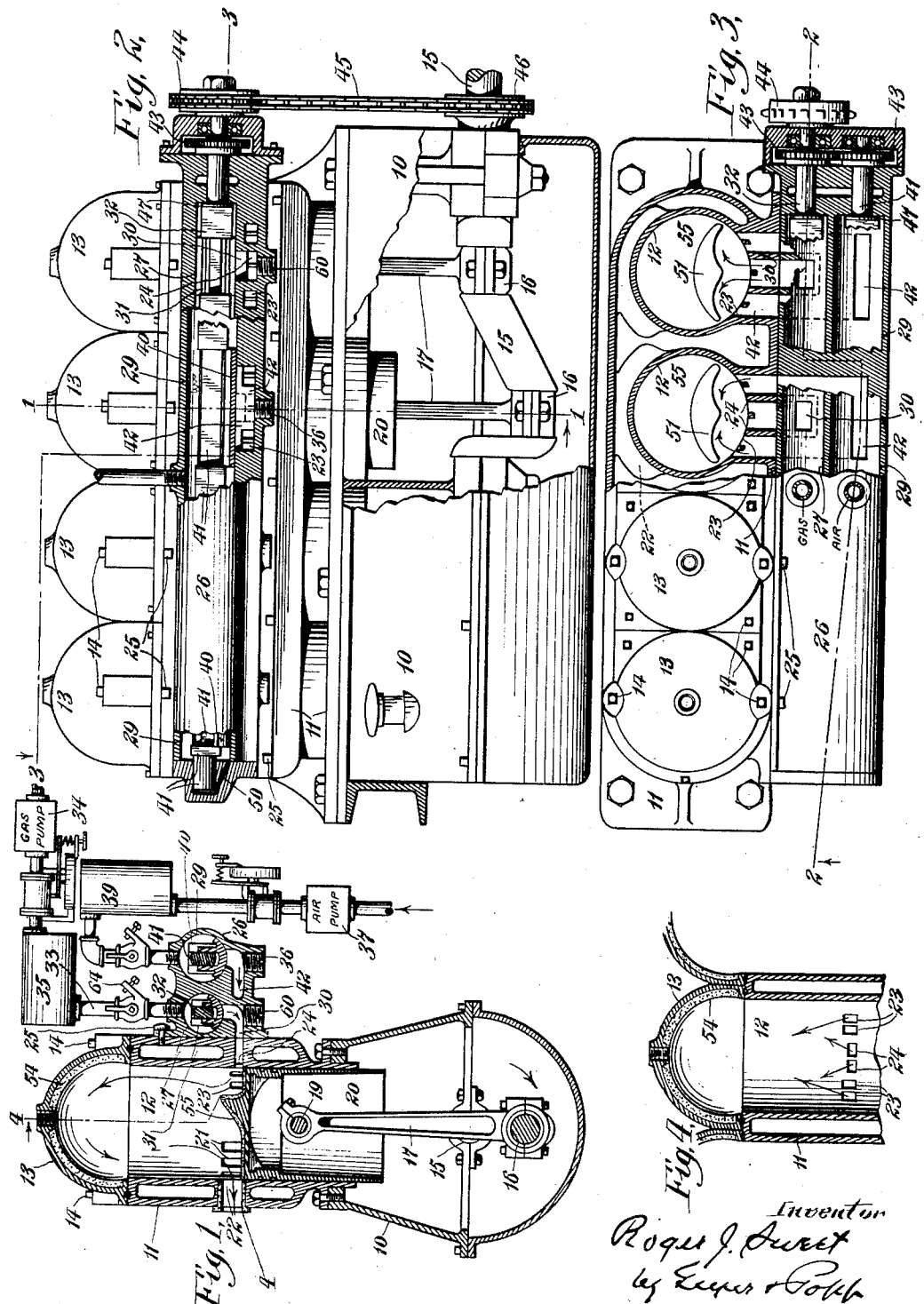

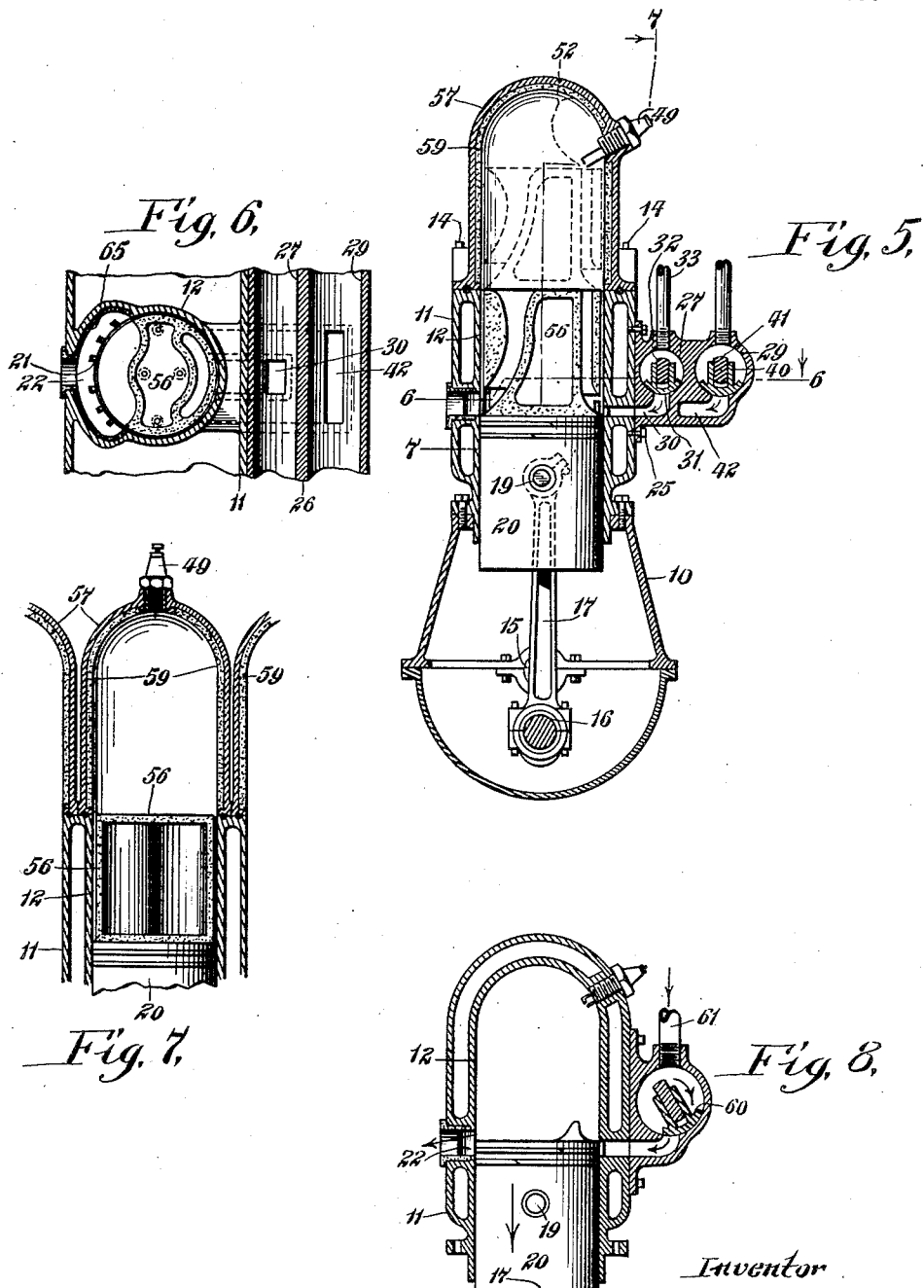

Nov. 15, 1927.

R. J. SWEET 1,649,554

INTERNAL COMBUSTION ENGINE

Filed June 16, 1921  3 Sheets—Sheet 3

*Fig. 9,* *Fig. 10,* *Fig. 11,*

BEHAVIOR OF THE VAPOR WHERE THE FUEL AND AIR ARE UNIFORMLY MIXED

IMPOSSIBLE RATIO USUAL RATIO MOST ECONOMICAL RATIO

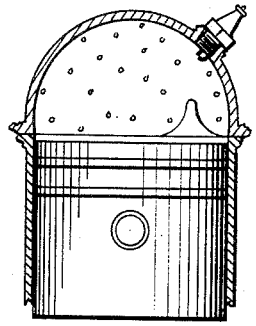 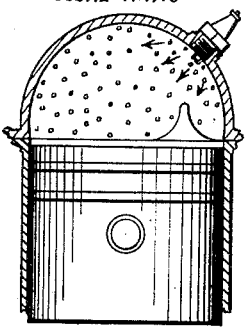 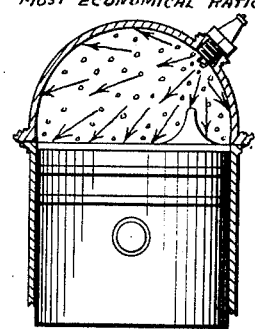

2% MIXTURE, MIS-FIRE. MUST BE ENRICHENED TO FIRE (i.e., MADE UNECONOMICALLY RICH AT LOW THROTTLE. 2% TO 7% WILL BACKFIRE

10% MIXTURE, NO KNOCKING BUT TOO RICH, ALTHOUGH EASILY IGNITED.

7% MIXTURE, KNOCKING RESULTING FROM SUDDEN EXPLOSION. MUST BE ENRICHENED TO PREVENT KNOCKING AT OPEN THROTTLE

BEHAVIOR OF THE VAPOR IN IMPROVED ENGINE, WITH ISOLATED FUEL CHARGE

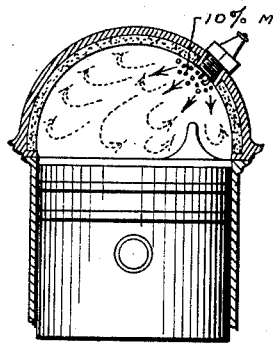 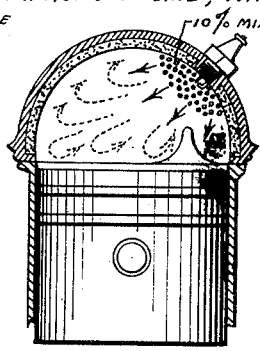 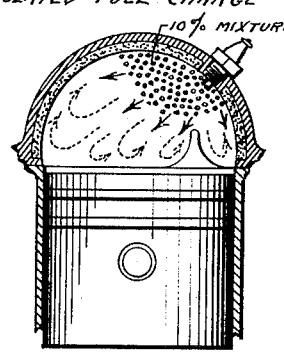

½% MIXTURE, FIRES REGULARLY.

*Fig. 12,*

4% (AVERAGE) MIXTURE, FIRES REGULARLY.

*Fig. 13,*

7% MIXTURE, FIRES REGULARLY. WITHOUT KNOCKING

*Fig. 14,*

Inventor
Roger J. Sweet
by [signature]
Attorneys,

Patented Nov. 15, 1927.

1,649,554

UNITED STATES PATENT OFFICE.

ROGER J. SWEET, OF BUFFALO, NEW YORK.

INTERNAL-COMBUSTION ENGINE.

Application filed June 16, 1921. Serial No. 477,964.

This invention relates to a novel means of handling the air and fuel which is supplied to an internal combustion engine and relates more particularly to a two cycle engine in which the exhaust gases are first scavenged and pure air admitted to the cylinder and thereafter the fuel injected into the cylinder before the compression stroke of the piston.

One of the objects of the invention is to provide a light weight, thermally-efficient, economical and reliable motor that will operate consistently and regularly under different load conditions,—which will, under all loads, provide a rich, easily ignited mixture to the region immediately adjacent to the spark plug or other igniting device,—and which will inject an exact quantity of air and fuel into the engine cylinder. A further object of the invention is to provide an engine in which the entire combustion chamber is lined with a material of low thermal conductivity, so as to prevent heat losses and reduce the size of the cooling system. A further object of the engine is to provide a means of internally cooling the engine by an air blast so as to chill any incandescent points projecting from the surface of the combustion chamber lining and thereby prevent pre-ignition. A still further object of the invention is to provide an engine in which a layer or wall of pure air is interposed between the exhaust gases and the fresh fuel so as to prevent backfire and in which the quality of the charge is not affected by the capacity of its combustion chamber. A still further object is to provide a means of preventing the overheating of the cylinder (from the waste heat of the exhaust gases) by insulating the exhaust passages from the metal walls of the cylinder. A still further object is to provide a motor having the least possible number of reciprocating parts and these parts very light and simple. A yet further object is to provide a means of preventing heat absorption by the piston thereby permitting the same to run cooler and at a greater speed, without danger of lubrication failure.

In the accompanying drawings: Figure 1 is a vertical transverse section through one form of the improved engine and taken on line 1—1, Fig. 2. Figure 2 is a vertical longitudinal section of the same engine with parts broken away and taken on line 2—2, Fig. 3. Figure 3 is a top plan view of the same form or engine with parts broken away and taken on line 3—3, Fig. 2. Figure 4 is a detail vertical longitudinal section through the form of engine shown in Figs. 1-3, inclusive, and taken on line 4—4, Fig. 1. Figure 5 is a vertical transverse section similar to Fig. 1, but showing a modified form of engine. Figure 6 is a horizontal section through the said modified form of engine with the valves removed and taken on line 6—6, Fig. 5. Figure 7 is a vertical longitudinal section through the said modified engine and taken on line 7—7, Fig. 5. Figure 8 is a fragmentary, vertical, transverse section through an engine having a modified form of fuel control and also showing the valve arrangement whereby the pressure in the measuring chamber is maintained in spite of leakage past the piston. Figures 9, 10 and 11 are vertical fragmentary sections through an engine cylinder showing the behavior of the vapor in an ordinary two-cycle engine. Figures 12, 13 and 14 are vertical fragmentary sections through the improved engine showing the efficient and reliable behavior of the vapor therein under different load conditions.

Similar characters of reference refer to like parts throughout the several views.

Referring first to the type of four cylinder two cycle engine shown in Figs. 1-4, inclusive, 10 represents a usual form of crank case and 11 a typical cylinder block having a plurality of cylinders 12 arranged thereon, and 13 a plurality of individual cylinder heads which latter are secured by suitable bolts 14 to said cylinder block. The cylinder block 11 may either be suitably waterjacketed, as shown in the drawings or air cooled. The water jacket may, however, be greatly reduced in size for reasons to be hereinafter described. Suitably journaled in the crank case is the usual crank shaft 15, to whose crank throws 16 are journaled the usual connecting rods 17 of the several cylinders. The upper ends of said connecting rods are suitably secured to wrist pins 19 journaled in their companion pistons 20. Inasmuch as it is a two cycle engine that is illustrated, the same is provided on the rear side of the cylinder with exhaust ports 21, which open into exhaust chambers 22 to permit the burned or exhaust gases to escape from the cylinder when the piston reaches the lower end of its stroke. On the front side of the cylinder and opposite to the said exhaust ports 21 are a number of air inlet ports 23 and a number of fuel inlet ports 24. As best shown in Fig. 4, the said fuel inlet ports 24 are located between pairs of air inlet ports 23. Secured by suitable cap screws 25 or otherwise to the cylinder block is a longitudinally disposed, valve casing 26 provided internally with a cylindrical, longitudinal fuel valve chamber 27 and a cylindrical longitudinal air valve chamber 29, said valve chambers extending substantially the entire length of the cylinder block.

Communicating individually with the fuel inlet ports 24 of each cylinder 12, is a fuel measuring chamber 30 whose volume may be adjustably varied by a screw plug 60, which latter may be adjustably either screwed into or out from said chamber, said plug being preferably provided with a screw driver slot for this purpose. It is assumed that the fuel employed in this engine is natural gas, but any other suitable gas, such as a mixture of air and volatilized hydrocarbon (e. g. carbureted gasoline) or producer or coal gas or any other oxidizable gas may be employed. Each of these fuel measuring chambers 30 of each of the several cylinders communicates individually with the aforesaid cylindrical, fuel, valve chamber 27 through a suitable vertical port, the flow through which is controlled by a Corliss-type rotary valve 31 whose outer semi-cylindrical surface bears against the inner cylindrical surface of the fuel valve chamber 27. Each of these Corliss fuel valves is rotated synchronously with the engine by a longitudinally disposed valve shaft 32 disposed concentrically with respect to said valve chamber and suitably journaled at opposite ends of the valve casing. Each valve is prevented from twisting on said valve shaft by being arranged upon a flattened portion thereof, and each valve is laterally or radially movable, relatively to said shaft, so as to, at all times, automatically compensate for the wear on the curved peripheral face of the valve. The gaseous fuel that fills the said valve chamber enters the same through a suitable pipe 33, and the pressure in said chamber is at all times maintained constant under constant load conditions by a suitable force pump 34 and a compensating tank 35 which supply said fuel pipe 33 from any suitable source (not shown) of gaseous fuel. The pressure in said tank may be maintained constant by the pressure regulating valve shown, or otherwise. This source of gaseous fuel may be a gas pipe line or an ordinary gasoline carbureter or other source as heretofore explained. Also formed in said valve casing 26 is the aforesaid longitudinal cylindrical air valve chamber 29 which is suitably supplied with air under a constant pressure from a suitable air pump 37 and an equalizing air tank 39. This air is preferably dampened and washed the dampness being used to increase the chilling effect of the air blast, hereinafter described. Arranged in this air valve chamber are a plurality of Corliss air valves 40 similar to the aforesaid Corliss fuel valves 31 and similarly rotated by a longitudinal air valve shaft 41 suitably journaled at its opposite ends in the valve casing 26. Thus, each cylinder of the engine is provided with its own individual companion air valve 40 which communicates periodically and individually through an air measuring chamber 42 with the aforesaid air inlet ports 23. Likewise each cylinder is provided with its own Corliss fuel valve 31 and fuel measuring chamber 30 and fuel inlet ports 24. That is, each cylinder is provided with its own individual air and fuel measuring chambers, and air and fuel Corliss valves. The air measuring chamber 42 is arranged to be adjustably altered in volume by a suitable screw plug 36 similar to the fuel screw plug 60 aforementioned.

Each of said valve shafts 32 and 41 is provided at its front end with a gear wheel 43, the gears of the two shafts meshing with each other. The inner or fuel valve shaft 32 extends outwardly somewhat further than its companion and is provided at its extreme end with a sprocket wheel 44 driven by a chain belt 45 whose lower turn engages a sprocket wheel 46 mounted on the crank shaft of the engine. Both of the valve shafts are caused to be forced longitudinally toward the sprocket wheel end of the same by reason of the constant pressure in both valve chambers inasmuch as only this end of the shaft is exposed to atmospheric pressure which is much lower than the pressure in the valve chambers. This action is utilized to prevent leakage of gas or air through the valve shaft bearings, by making a ground or gas tight joint at 47 between the end vertical face of each valve chamber and the adjacent end of the squared or enlarged part of the companion valve shaft. An anti-friction washer is also preferably interposed at this point, as shown. Thus the enlarged end of each of said valve shafts will be constantly caused to grind its own gas tight seat and thus prevent any leakage, this grinding action being automatically rendered greater when greater pressures are present in the valve chambers. To prevent this longitudinal pressure from being even temporarily destroyed by a partial vacuum at the extreme outer end of the rear bearing (which is at the other end of each of said shafts) a small compensating hole 50 is formed in the valve casing 26, so that the pressure against the extreme end of said valve shaft is always the same as the pressure in each of the valve chambers themselves.

The upper end of the piston is provided with a double concave deflector 51 (see Fig. 3) which operates to deflect air currents inwardly or toward each other as these air currents enter the cylinder from the pairs of outside air inlet ports 23. The said deflector also operates to deflect the fuel gas currents outwardly as they enter the cylinder from the central fuel inlet ports 24. This means for mixing the fuel with some of the air permits of a sufficient admixture of air with the fuel to cause a combustible mixture, (see Figs. 12, 13 and 14) and to thereby ensure a quick ignition of the fuel. Inasmuch as the air inlet ports 23 extend higher up and hence are uncovered by the piston (on the down stroke) before the fuel inlet ports 24 (see Fig. 4) it follows that the air will rush into the cylinder first and as two main air streams (Fig. 3) are deflected inwardly, it follows that where a small charge of gas is exuded in the form of a small, low-pressure, puff of gas from the fuel inlet ports 24, that although this fuel is mixed somewhat with the air (because it is deflected outwardly) yet said fuel is prevented from becoming excessively diluted or spreading throughout the whole combustion chamber by reason of the already established inwardly converging walls of air from the outer ports 23. These walls of air also prevent the fresh fuel mixture from coming in contact with the exhaust gases, thus avoiding any liability to "backfire". As shown in Fig. 1, the piston is at the bottom of its stroke. In this position, the exhaust gases are passing out of the exhaust ports 21 and are impelled in this direction by the blast of compressed air from the air inlet ports 23. The volume of the air charge can be increased or decreased thru a very wide range, by simply varying the pressure in the tank 39 by suitably moving the control handle of the pressure regulating valve shown, or otherwise, (the plugs 36 being only used for individual cylinder volume adjustments). The usual proportion of air should be preferably made equal to 93% of the total volume of the cylinder with the piston at the bottom (assuming a 7% mixture to give the most powerful explosion). Under light loads a certain amount of exhaust gases will remain in the cylinder but under full power said exhaust gases will all be crowded out by the full gas charge coming in and pushing them out. Under very light loads and in special hot air types of engines the air charge is proportioned to the gas charge by suitable interconnected linkage control (not shown).

Inasmuch as the gas is introduced separately into the cylinder and not together with the air, the fuel under light loads is segregated in a small compact explosive volume 52 (see Figs. 12, 13 and 14) which is pushed up into the vicinity of the spark plug 49 or other igniting device when the piston rises. Thus the fuel is invariably fired or ignited even though the quantity of fuel actually used is so small that it could not be ignited at all if mixed uniformly with all of the air in the combustion chamber (see Fig. 9). The excess air in the cylinder which does not combine chemically with the fuel is merely heated and thereby increases the pressure in the combustion chamber, similarly to the manner in which the pressure is obtained in a hot air engine, i. e., by heating the air (which is above the piston, before the latter starts to descend). This results in increased economy at low throttle—since the lower temperatures and larger volumes do not suffer from radiation as would a smaller volume and higher temperature as is used in the ordinary gas engine in which the total charge is throttled resulting in reduced compression and working volumes.

The head of this improved engine does not require water jacketing, the latter being rendered unnecessary by the novel construction and internal cooling means of this improved engine which is constructed as follows:

Suitably molded or otherwise formed on the concave inner surface of the cylinder head 13, is a lining 54 composed of material having a very low thermal conductivity. By reason of this property, said lining will get very hot or even incandescent on its inner skin or surface, but this temperature will not penetrate the lining appreciably, and therefore the total amount of heat absorbed by this lining is very small. As before stated, the compressed air is forced in and up into the cylinder from the air inlet ports 23 at the bottom of the piston stroke. This blast of cool air (incidentally also, air drops in temperature upon expansion) being directed up and against the said lining 54, the small amount of total skin heat in said lining is readily absorbed and incandescent points chilled by the injected air; and the combustion chamber is thus prepared for a fresh charge of fuel without danger of pre-ignition. For the same reason, the upper face of the piston may be provided with a refractory head or non-conducting lining 55 which holds all the heat in its uppermost skin or layer, said heat (which is small in total amount) being likewise absorbed by the incoming cool air blast. Thus a minimum of heat is transferred from the combustion chamber to the piston which prevents burning of oil in the crank case and greatly assists the lubrication of the metal walls of the cylinder. In fact, for aeronautic work where the speed of travel is high and the temperature of the atmosphere low, then very little cylinder cooling is required, thus greatly cutting down the weight. The cooling effect of this air blast is very much greater and more satisfactory where the air is charged with water vapor as can be easily done by passing through a suitable air washer.

This confining of the heat to the combustion chamber is carried still further in the modified form of slow speed engine shown in Figs. 5, 6 and 7. Here is shown a very high and hollow refractory piston head 56, the height thereof being preferably substantially equal to the length of the piston stroke. A very high cylinder head 57 is provided to accommodate this enlarged piston head, said cylinder head being lined with a refractory lining 59, which extends down to the upper limit of travel of the metal piston. It is evident that the combustion chamber i. e., the space above the piston head is, in this case, entirely lined on all sides with refractory material so that a minimum of heat transfer occurs. The metal piston itself however bears frictionally against only the metal surface of the cylinder. The exhaust chamber 22 is also lined with a refractory lining 65, which prevents the transfer of heat to the metal parts of the engine and also prevents the depositing of amorphous carbon by reason of the high skin temperature of said lining which causes the immediate oxidation of such carbon.

In Fig. 8 is shown a still further modified form of the invention. In this case, a single Corliss valve 60 is employed which is fed from a supply pipe 61 carrying a combustible mixture of air and fuel such as is produced for instance, by the ordinary gasoline carbureter or the ordinary gas mixer of a gas engine. Such an engine cannot be nicely throttled down (as in the case of the engines having separate air and pure fuel valves) but it is cheaper to manufacture and is satisfactory for the constant heavy duty work, inasmuch as the definite fuel measuring features have been retained.

The general operation of the engine is as follows:

As the piston descends, the exhaust gases are first vented from the cylinder through the exhaust ports 21. Thereafter a definitely measured quantity of compressed air is injected into the cylinder through two pairs of air inlet ports 23 from the air measuring chamber 42, the air streams (in the construction shown in Figs. 1-4, inclusive) converging toward each other and being impelled upwardly against the refractory lining 54, where the high temperature, but low total quantity of skin heat of said lining is quickly absorbed and any incandescent points chilled. The air is then deflected downwardly by the spherical shape of the cylinder head 13 and drives out or scavenges all of the remaining burnt gases through the exhaust ports 21. These exhaust gases then pass into the insulated exhaust chamber 22, the lining of which prevents heat transfer to the metal parts of the cylinder without any burden on the cooling system and without disturbing the lubrication of the piston, etc. Thereafter, a definitely measured quantity of fuel gas is ejected from the fuel measuring chamber 30 into the cylinder through the fuel inlet ports 24. Inasmuch as this fuel is encased on all sides by an air wall, the same cannot come in contact with the exhaust gases, and backfire is thereby avoided. Under normal operating conditions, the only control needed by the engine is the control of its gas supply which may be obtained by altering the position of the fuel valve 64 (Fig. 1) or by adjustably altering the discharge pressure of the regulator valve (not shown) which controls the gas pressure in the tank 35. This alteration of the fuel-gas charge automatically alters the amount of exhaust gases permitted to remain in the cylinder at the beginning of the piston's compression stroke. The maximum power condition occurs when the gas is increased to a volume which, together with the fuel air charge, completely occupies the combustion chamber, excluding all spent gases, and forming with it a mixture which, on burning, gives a complete and powerful combustion.

The measuring action of this engine is extremely exact despite wear on engine parts or pistons and the wear on the valves is automatically taken up and self grinding, this being a characteristic which is common to all Corliss valves. Both the air and the fuel Corliss valves remain open and permit a continued communication between the valve chambers 27 and 29 respectively, and the measuring chambers 30 and 42 respectively, up to the very moment that the piston uncovers the respective points which establish a communication into the cylinder. This fact is shown graphically in Fig. 8. Inasmuch as the air and gas pressures respectively, in the valve chambers are always maintained constant, it follows that the pressure in the measuring chambers (prior to the injection of the air or gas into the cylinder) is likewise absolutely the same, even though there be considerable leakage past the piston. The volume of the measuring chambers may be adjusted for different kinds of fuels and different altitudes by turning the adjustment plugs 60 and 36. Inasmuch as the air and gas is injected into the cylinder separately, a small quantity of fuel and gas forming the rich isolated mixture 52, Fig. 5, is prevented (under light load conditions) from mixing with all of the air so that this improved engine will fire regularly even when idling, whereas an ordinary engine with the same proportion of air and fuel would either fire irregularly, back fire, or not fire at all, without having the carbureter adjusted to give an excessively rich carbonizing mixture for low speeds and low power running, as is now common practice. The internal cooling of the thin, skin-heated lining of the engine reduces and in some cases entirely eliminates, the expense, weight and space occupied by the cylinder cooling system. The lining of the combustion chamber with a non-conducting material cuts down very materially the amount of heat loss from the combustion chamber and thereby greatly increases the efficiency and the power of the engine. The lining on the piston head prevents the heat from passing through it and ruining the oil in the crank case. It also prevents a transfer of heat to the bearings and also the cylinder walls can keep the piston cooler (low heat transfer) which permits of greater speed. This results in a big saving of cylinder oil as well as increased life of the cylinder and piston. Inasmuch as both the gas and the air pump may be disposed remotely from the engine they may be disposed wherever suitable space is available. This applies particularly to aeronautic work where the center of gravity and the metacentric height is very vital. Also this permits of a lighter piston than in the case of engines in which the pressure of the gas and fuel injected into the cylinder is obtained by a long heavy piston having two different diameters or two separate heads, in which case, any leakage past such a piston alters the mixture fed to the cylinder, so that when such a piston becomes worn, it seriously alters the operation of the engine. In the present improved engine wear, of valves and pistons, does not affect the gas or air charge except only on the final compression of the mixture in the combustion chamber itself. The engine is superior to the Diesel type in that it measures a large volume of easily controlled gas instead of a very minute quantity of liquid fuel for each power stroke of the piston, so that there results no variation in the fuel charge. In the present improved engine the quantity of combustible fuel (richness of air-fuel mixture) is varied by changing the pressure of the gaseous fuel in the tank 35, (by changing the spring pressure, for instance of an ordinary regulating valve controlling the flow from the pump to the tank). This is not only less complicated, but is vastly more accurate inasmuch as it is always easier to measure large quantities than small quantities. Furthermore, the Diesel type is only useful for slow speed work whereas the present invention (in the form shown in Figs. 1 to 4, inclusive) may be operated at extremely high speeds. Furthermore, this improved engine with its cool light-weight reciprocating parts permits of the maximum low-vibration advantages of the two cycle motor and also the increased power available for any definite piston displacement, thereby cutting down the size and weight as well as the vibration of the power plant. The use of Corliss valves is of very considerable mechanical value in that this type of valve grinds itself constantly and automatically, and the longitudinal valve shafts also grind themselves endwise automatically and thereby prevent leakage from the valve chambers. Furthermore, the adoption of an air and a fuel gas pump separate from the engine proper permits the same to be designed most efficiently for their particular purposes, whereas when such pumping apparatus is combined in the engine proper, a number of mechanical difficulties are inevitably present such as the dilution of the oil system by hydrocarbon liquids, inefficient pump speeds, material used, etc. Furthermore, the ease of starting this engine is considerably increased by reason of the fact that the pumps may be first started (from an electric motor or the like) and also flooding of the engine is largely eliminated, when starting because of the fact that the fuel and air are injected at considerable pressure into the cylinder and thereby properly mixed even though the engine is very slowly turned over. And at the same time there is no possibility whatsoever of either the fuel gas or the air "blowing through" the cylinder, because the Corliss valves are always closed when the inlet air and gas ports are open, and vice versa. Furthermore, the construction permits of a valve chamber which can be made of special alloy or light-weight metal separate from the cylinder proper, so that no complicated cores or molds or machining operations are required in the construction of the engine. Furthermore, the engine is prevented from excessive overheating (due to the hot spent gases) by insulating these gases from the metal of the cylinder the instant they leave the port edges. This greatly reduces the cylinder cooling required besides making this heat available at a higher temperature for other uses such as heating, etc. The choking of the exhaust passages is also prevented by the use of the exhaust chamber lining 65, whose skin or inner surface attains such a high temperature that any amorphous carbon coming into contact therewith is immediately oxidized and converted to carbon dioxide and passes as a gas out to the muffler. The same action occurs, if any carbon is precipitated on the cylinder lining 54, which, at the time of the ignition of the fuel attains such an intense skin incandescence that no carbon can exist as such in the presence of the air in the cylinder. Despite this high temperature incandescence of the lining however, the same can occur only on the thin inner skin of said lining by reason of the low thermal conductivity of the material of which it is composed. Hence the actual total heat to be absorbed by the injected cold air blast is very small and hence this incandescent skin is very readily chilled down to a proper temperature for the admission of fresh fuel.

I claim as my invention:

1. An internal combustion engine comprising a cylinder, a measuring chamber communicating therewith periodically, a cylindrical valve chamber supplied with fuel under constant pressure and communicating with said measuring chamber, and a Corliss fuel valve disposed within said valve chamber and caused to be seated by said pressure and adapted to be closed periodically and simultaneously with the opening of communication between said cylinder and measuring chamber so that the measuring chamber is cut off from said fuel supply when said piston uncovers said inlet port.

2. An internal combustion engine comprising a cylinder having an igniting device arranged therein, means for filling the main portion of said cylinder with a variable quantity of pure air, and means for injecting a variable quantity of rich combustible mixture fuel into said cylinder prior to compression in the vicinity of said igniting device and substantially unmixed with all of the aforesaid pure air therein.

3. An internal combustion engine comprising a cylinder, and a piston working in said cylinder, the cylinder having a mixture port, two air ports on opposite sides of said mixture port, and an exhaust port diametrically opposite said mixture and air ports and said air ports being constructed to be opened in advance of the mixture port.

4. An internal combustion engine comprising a cylinder, an inlet air port feeding compressed air into said cylinder, a fuel port feeding fuel under pressure into said cylinder, and a piston having a curved deflector which operates to deflect the air laterally in the one direction and to deflect the flow of fuel laterally in another direction.

5. An internal combustion engine comprising a cylinder, a fuel inlet port formed at the lower end of said cylinder and feeding fuel under compression into said cylinder, inlet air ports arranged on opposite lateral sides of said inlet fuel port, and a piston arranged in said cylinder and having a curved deflector adapted to deflect the fuel stream outwardly and the air stream inwardly.

6. An internal combustion engine comprising a cylinder, a measuring chamber communicating periodically therewith, a valve chamber supplied with fuel under pressure, a valve arranged in said valve chamber and permitting a communication between said valve chamber and said measuring chamber up to the very moment that communication is established between said measuring chamber and said cylinder, and means for altering the size of said measuring chamber.

7. An internal combustion engine comprising a cylinder, a measuring chamber communicating periodically therewith, a valve chamber supplied with fuel under pressure, a valve arranged in said valve chamber and permitting a communication between said valve chamber and said measuring chamber up to the very moment that communication is established between said measuring chamber and said cylinder, and means for altering the size of said measuring chamber comprising a screw plug which may be adjustably screwed into or out of the measuring chamber.

8. An internal combustion engine comprising a cylinder having an igniting device arranged therein, means for filling the main portion of said cylinder with a variable quantity of air, means for injecting a variable quantity of rich combustible mixture into said cylinder prior to compression in the vicinity of said igniting device and substantially unmixed with all of the aforesaid pure air therein, and means which provide a small puff of air entering the cylinder in advance of and surrounding a small puff of said mixture.

9. An internal combustion engine comprising a cylinder having an igniting device arranged therein, means for filling the main portion of said cylinder with a variable quantity of air, means for injecting a variable quantity of rich combustible mixture into said cylinder prior to compression in the vicinity of said igniting device and substantially unmixed with all of the aforesaid pure air therein, means which provide a small puff of air entering the cylinder in advance of and surrounding a small puff of said mixture and means which provide a steady flow of undiluted charges of said mixture.

10. An internal combustion engine comprising a cylinder having an igniting device arranged therein, means for filling the main portion of said cylinder with a variable quantity of air, means for injecting a variable quantity of rich combustible mixture into said cylinder prior to compression in the vicinity of said igniting device and substantially unmixed with all of the aforesaid pure air therein, means which provide a small puff of air entering the cylinder in advance of and surrounding a small puff of said mixture and means for accurately measuring small charges of said mixture without danger of air dilution due to leakage.

11. An internal combustion engine comprising a cylinder having an igniting device arranged therein, means for filling the main portion of said cylinder with a variable quantity of air, means for injecting a variable quantity of rich combustible mixture into said cylinder prior to compression in the vicinity of said igniting device and substantially unmixed with all of the aforesaid pure air therein, means which provide a small puff of air entering the cylinder in advance of and surrounding a small puff of said mixture and means for handling the volume of said mixture without agitation so as to produce a separate ball of said mixture.

12. An internal combustion engine comprising a cylinder having an igniting device arranged therein, means for filling the main portion of said cylinder with a variable quantity of air, means for injecting a variable quantity of rich combustible mixture into said cylinder prior to compression in the vicinity of said igniting device and substantially unmixed with all of the aforesaid pure air therein, means which provide a small puff of air entering the cylinder in advance of and surrounding a small puff of said mixture and pressure operated means for supplying the volume of mixture to avoid a vacuum and stretching of the mixture.

13. An internal combustion engine comprising a cylinder, an inlet air port feeding compressed air into said cylinder, a fuel port feeding fuel under pressure into said cylinder, and a piston having a curved deflector which operates to deflect the air laterally in the one direction and to deflect the flow of fuel laterally in another direction, said piston being provided at its inner end with a pocket.

ROGER J. SWEET.